United States Patent
Stenström et al.

(10) Patent No.: US 6,466,616 B1
(45) Date of Patent: Oct. 15, 2002

(54) POWER EFFICIENT EQUALIZATION

(75) Inventors: Niklas Stenström, Helsingborg; Bengt Lindoff, Lund, both of (SE)

(73) Assignee: Telefonaktiebolaget LM Ericsson (publ) (SE)

( * ) Notice: Subject to any disclaimer, the term of this patent is extended or adjusted under 35 U.S.C. 154(b) by 0 days.

(21) Appl. No.: 09/347,121

(22) Filed: Jul. 2, 1999

(51) Int. Cl.$^7$ ................................................ H03H 7/30
(52) U.S. Cl. ....................... 375/233; 375/220; 375/221; 375/234; 708/322; 708/323
(58) Field of Search ................................. 375/316, 295, 375/234, 233, 232, 230, 229, 221, 220, 219; 708/322, 323

(56) References Cited

U.S. PATENT DOCUMENTS

| | | | |
|---|---|---|---|
| 5,251,233 A | 10/1993 | Labedz et al. ................. | 375/12 |
| 5,353,307 A | 10/1994 | Lester et al. .................. | 375/14 |
| 5,473,686 A | 12/1995 | Virdee ......................... | 379/410 |
| 5,563,911 A | * 10/1996 | Uesugi et al. ............... | 375/232 |
| 5,592,340 A | * 1/1997 | Minuhin et al. .............. | 360/46 |
| 6,302,576 B1 | * 10/2001 | Ono et al. .................... | 371/43.6 |

FOREIGN PATENT DOCUMENTS

| | | |
|---|---|---|
| EP | 0 541 225 A1 | 9/1992 |
| EP | 0 615 347 A1 | 9/1993 |
| JP | 6268480 | 9/1994 |
| JP | 7239691 | 9/1995 |
| JP | 8065205 | 3/1996 |
| JP | 9046275 | 2/1997 |
| WO | 9407311 | 3/1994 |
| WO | 9815901 | 4/1998 |

OTHER PUBLICATIONS

Abstract summary of Automatic Equipment, No. 63–126329(A), dated May 30, 1988.
Digital Communications, Third Edition, by John G. Proakis, Ph.D., P.E., 1995, pp. 584–591, 621–626.
IEEE Transactions on Communications, vol. 37, No. 5, May 1989, "Delayed Decision–Feedback Sequence Estimation", Alexandra Duel–Hallen, et al, pp. 428–436.

* cited by examiner

*Primary Examiner*—Chi Pham
*Assistant Examiner*—Pankarj Kumar
(74) *Attorney, Agent, or Firm*—Jenkens & Gilchrist, a Professional Corporation

(57) ABSTRACT

An apparatus and method are provided that effectively minimizes the computational load and reduces the overall power consumption in a receiver by adjusting the number of taps used in a pre-filter and an equalizer. More specifically, the apparatus includes a memory for storing a signal, and a channel estimator for estimating a quality parameter and a number of channel filter taps using the stored signal. The apparatus further includes a controller for evaluating the estimated quality parameter and the estimated number of channel filter taps to determine a number of pre-filter taps, if any, to be used in the pre-filter. In addition, the controller evaluates the estimated quality parameter and the estimated number of channel filter taps to determine a number of equalizer taps to be used in the equalizer where the number of equalizer taps is less than or equal to the estimated number of channel filter taps.

24 Claims, 5 Drawing Sheets

POWER EFFICIENT EQUALIZATION

BACKGROUND OF THE INVENTION

1. Technical Field of the Invention

The present invention generally relates to the telecommunications field and, in particular, to an apparatus and method that minimizes the computational load in a receiver by adjusting the number of taps used in a pre-filter and equalizer.

2. Description of Related Art

In the telecommunications field, one of the most significant design challenges involves the development of new ways to improve the quality of a received signal. The quality of the received signal is adversely affected by intersymbol interference (ISI) which is often recognized as one of the major obstacles to high speed data transmission over mobile radio channels. ISI is attributable to multipath within time dispersive radio channels and results in the distortion of a transmitted signal that causes bit errors in the received signal at a receiver.

The most common way to compensate for ISI is to use some type of equalizer in the receiver. One of the most desirable or optimal types of equalizers available is a maximum likelihood sequence estimation (MLSE) equalizer also known as a Viterbi decoder. Basically, the MLSE tests all possible data sequences (rather than decoding each received symbol by itself) and chooses the data sequence with the maximum probability as the output. However, the MLSE equalizer can be too complex for practical use in some types of communications systems or receivers.

Therefore, different types of equalizers which are approximations of the MLSE equalizer have been developed to enable the selection of a suitable equalizer when choosing between performance and complexity. Two of these different types of equalizers currently available include a decision feedback equalizer (DFE) and a delayed decision feedback sequence estimator (DFSE).

The basic idea behind the DFE is that once the received signal has been detected and decided upon, the ISI that it induces on future signals can be estimated and subtracted out before detection of subsequent signals. Whereas, the DFSE uses both the MLSE and DFE techniques to compensate for the ISI introduced in the radio channel. In other words, the DFSE uses the MLSE technique to compensate for some of the ISI introduced and the DFE technique is used to compensate for the rest of the ISI.

In addition, the receiver typically utilizes a pre-filter to filter the received signal before it is input to the equalizer. The pre-filter operates to concentrate the energy into channel taps handled by the MLSE (in the DFSE case) or to concentrate the energy into the first channel tap of the DFE (in the DFE case). The traditional DFSE and traditional pre-filter are both described in greater detail below with respect to FIGS. 1–3.

Referring to FIG. 1, there is a block diagram illustrating the basic components of a conventional communications system 100. The communications system 100 includes a transmitter 102 that receives an original message u(t) and transmits the original message on a radio channel 104 to a receiver front end 106. In addition to receiving the transmitted original message u(t), the receiver front end 106 also receives a noise element e(t).

The receiver front end 106 forwards the transmitted original message u(t) and the noise element e(t) to a receiver filter 108. The receiver filter 108 filters the transmitted original message u(t) and the noise element e(t) before an analog-to-digital convertor 110 converts the filtered original message u(t) and noise element e(t) to a received signal y(t). At this point, the received signal y(t) can be represented as either one of the two equations below:

$$y(t)=h(t)*u(t)+e(t), (t=1, \ldots, T) \quad (1)$$

$$y(t)=\Sigma_n u(t-n)h(n)+e(t), (t=1, \ldots, T) \quad (2)$$

where y(t) is the received signal; h is an unknown radio channel; u(t) is the original message; e(t) is the noise element; n is the total number of channel taps; and T is the number of received samples in a burst 200 (see FIG. 2). For instance, the burst 200 can be a typical Time Division Multiple Access (TDMA) burst including a training sequence 202 that is located between data 204 which are located between tails 206.

The received signal y(t) is input to a channel estimator 112 that operates to estimate the number of channel filter taps ĥ by correlating the received signal y(t) with the known training sequence 202 within the burst 200. The output of the channel estimator 112 includes the information parts of the received signal y(t) which are the estimated number of channel filter taps ĥ and an estimated noise effect $\hat{\sigma}^2$. The estimated channel filter taps ĥ, the estimated noise effect $\hat{\sigma}^2$ and the received signal y(t) are input to a pre-filter 114. Referring to FIG. 3A, there is an exemplary graph illustrating the signal strengths of the estimated channel filter taps ĥ before the pre-filter process.

The pre-filter 114, with a fixed number of taps, here called g(t), performs a pre-filter tap calculation based on the estimated channel filter taps ĥ and the estimated noise effect $\hat{\sigma}^2$ so that the signal energy (e.g., absolute value of the channel filter taps) is concentrated to the first channel taps in the filtered version of the estimated channel taps ȟ (e.g., ȟ(t)=g(t)*ĥ(t)). Referring to FIG. 3B, there is an exemplary graph illustrating the signal strengths of the filtered channel taps ȟ after the pre-filter process.

An equalizer 116 receives the filtered channel taps ȟ, the filtered received signal ỹ(t) (e.g., ỹ(t)=g(t)*ĥ(t)+g(t)*e(t)) and the transformed noise effect $\tilde{\sigma}^2$. The equalizer 116 (e.g., DFSE/DFE) has a set number of equalizer taps and operates to output both a symbol and soft information. The symbol is an estimation of the original message u(t). And, the soft information is a reliability measure of the estimated symbol or bits forming the estimated symbol.

To reduce ISI and improve the quality of the received signal, it is desirable to have as many pre-filter taps and equalizer taps as possible within the receiver. Unfortunately, as the number of pre-filter taps and equalizer taps increase, there is a corresponding and problematic increase in the computational load within the receiver. Moreover, the increase in the computational load within the receiver also causes an increase in the overall power consumption which can also be problematic whenever the receiver is incorporated within a mobile phone. Therefore, there is a need for an apparatus and method that effectively minimizes the computational load and power consumption in a receiver while improving the quality of a received signal by reducing ISI.

BRIEF DESCRIPTION OF THE INVENTION

The present invention is an apparatus and method that effectively minimizes the computational load and reduces the overall power consumption in a receiver by adjusting the number of taps used in a pre-filter and equalizer. More specifically, the apparatus includes a memory for storing a signal, and a channel estimator for estimating a quality parameter and a number of channel filter taps using the stored signal. The apparatus further includes a controller for evaluating the estimated quality parameter and the estimated number of channel filter taps to determine a number of pre-filter taps, if any, to be used in the pre-filter. In addition, the controller evaluates the estimated quality parameter and the estimated number of channel filter taps to determine a number of equalizer taps to be used in the equalizer where the number of equalizer taps is less than or equal to the estimated number of channel filter taps.

BRIEF DESCRIPTION OF THE DRAWINGS

A more complete understanding of the method and apparatus of the present invention may be had by reference to the following detailed description when taken in conjunction with the accompanying drawings wherein.

DETAILED DESCRIPTION OF THE DRAWINGS

Figure 4:
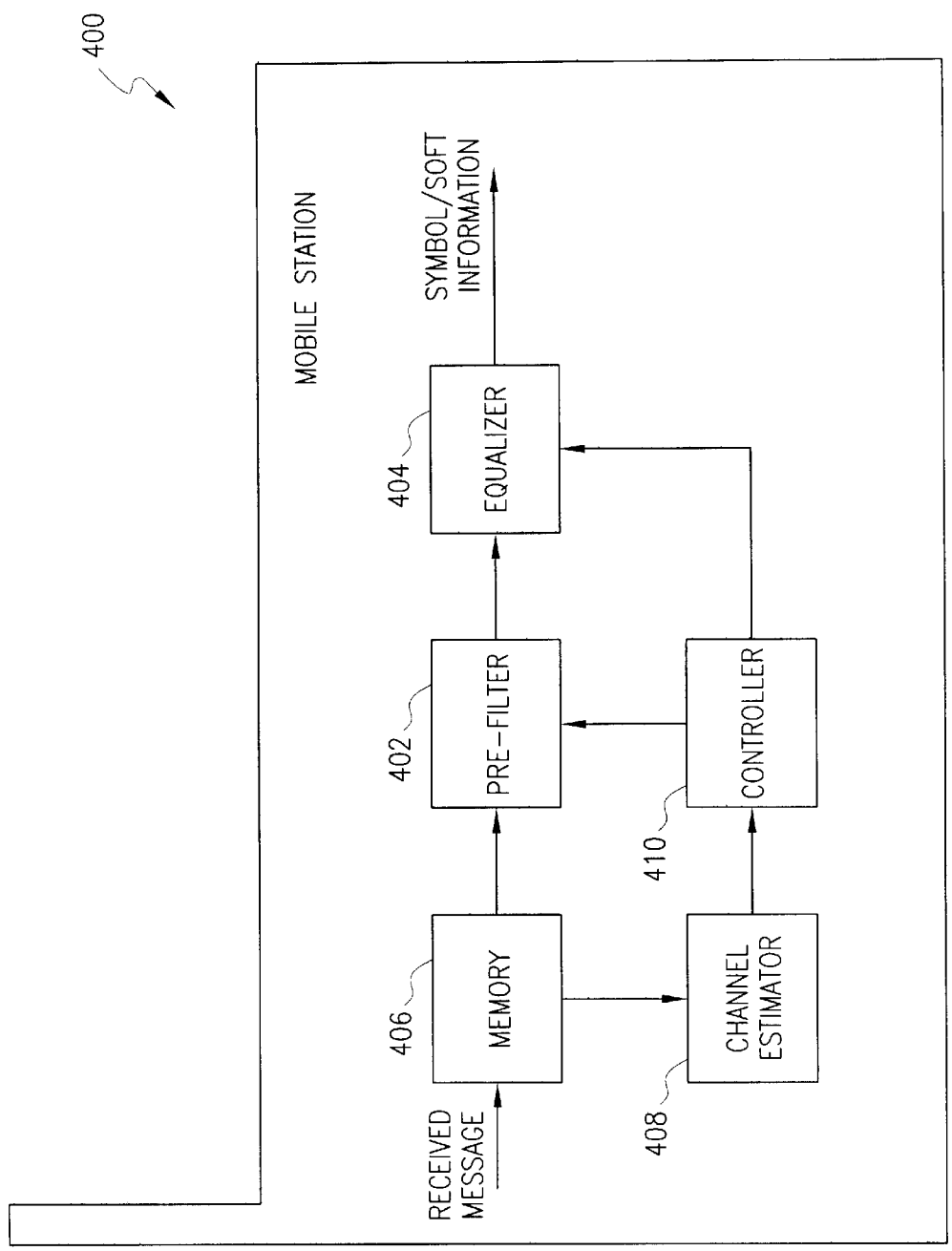
FIG. 4 is a block diagram illustrating the basic components of the present invention incorporated in a mobile station.
Figure 5:
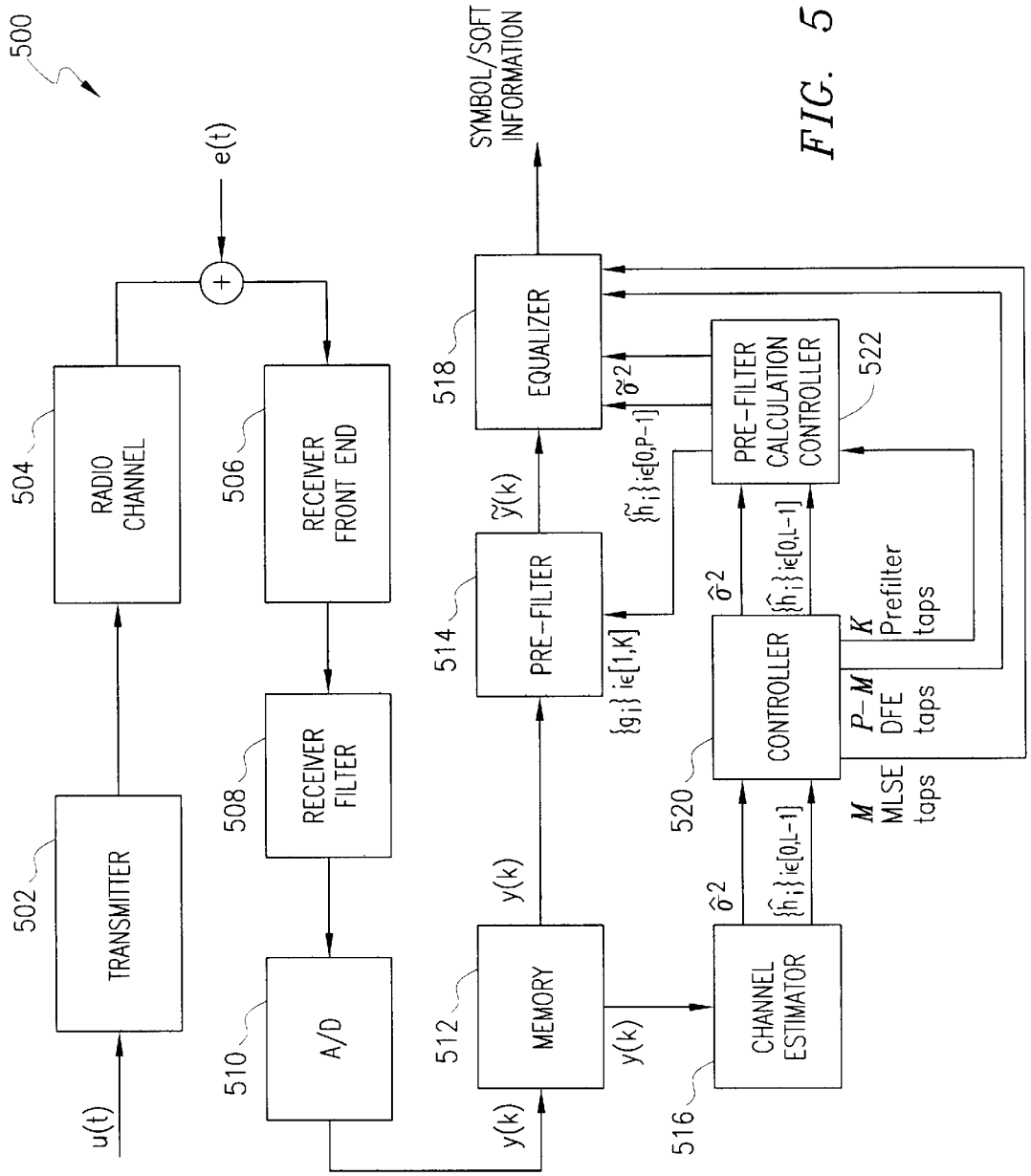
FIG. 5 is a block diagram illustrating in greater detail the basic components of the present invention incorporated in a communications system.
Figure 6:
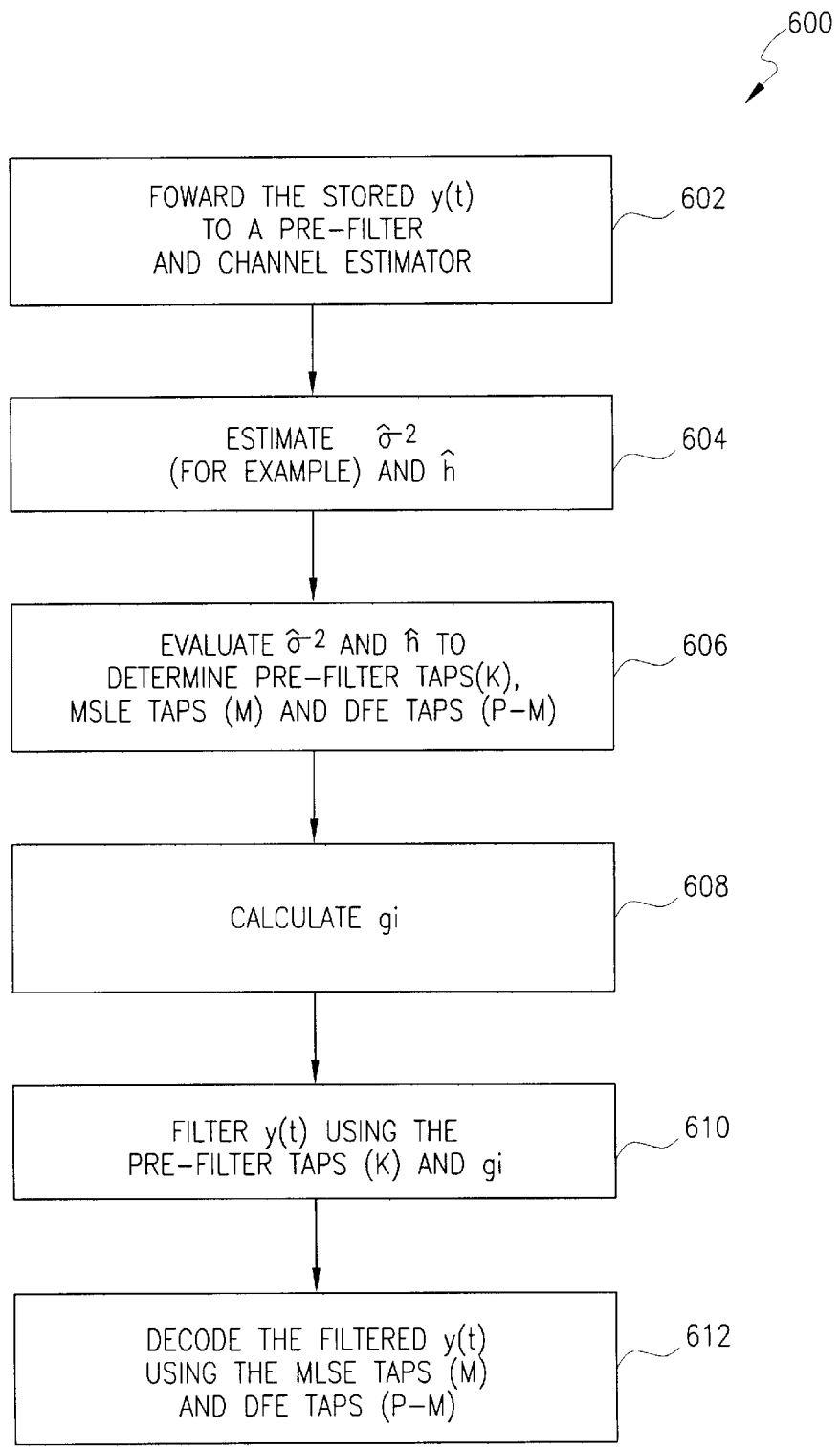
FIG. 6 is a flowchart illustrating the steps of the preferred method in accordance with the present invention.

Referring to the Drawings, wherein like numerals represent like parts throughout FIGS. 4–6, there are disclosed an exemplary mobile station 400, an exemplary communications system 500, and a preferred method 600 each of which is capable of adjusting the number of taps used in a pre-filter and equalizer in accordance with the present invention.

Although the present invention is described with respect to a mobile station 400 and communications system 500 operating in accordance with the Global System for Mobile Communications (GSM) specification, it should be understood that the present invention can be used within any communication device (e.g., pico base station), but is especially suited for use with TDMA communication devices. Accordingly, the mobile station 400, communications system 500 and preferred method 600 described should not be construed in a limited manner.

Referring to FIG. 4, there is illustrated a block diagram of the mobile station 400 incorporating the basic components of the present invention. Generally, the mobile station 400 operates to reduce the power consumption and minimize the computational load therein by adjusting the number of taps used in a pre-filter 402 and an equalizer 404. The mobile station 400 includes a memory 406 operable to store a received message, and a channel estimator 408 operable to estimate a quality parameter and a number of channel filter taps using the stored message. The mobile station 400 also includes a controller 410 operable to evaluate the estimated quality parameter and the estimated number of channel filter taps to determine a number of pre-filter taps, if any, to be used in the pre-filter 402. In addition, the controller is operable to evaluate the estimated quality parameter and the estimated number of channel filter taps to determine a number of equalizer taps to be used in the equalizer 404 where the number of equalizer taps is less than or equal to the estimated number of channel filter taps. A detailed description as to how the number of pre-filter taps and the number of equalizer taps are determined is provided below with respect to FIGS. 5–6.

Referring to FIG. 5, there is a block diagram of the communications system 500 illustrating in greater detail the basic components of the present invention. Certain details associated with the communications system 500 are known in the industry and as such need not be described herein. Therefore, for clarity, the description provided below in relation to the communications system 500 omits some elements known to those skilled in the art that are not necessary to understand the invention.

Figure 1:
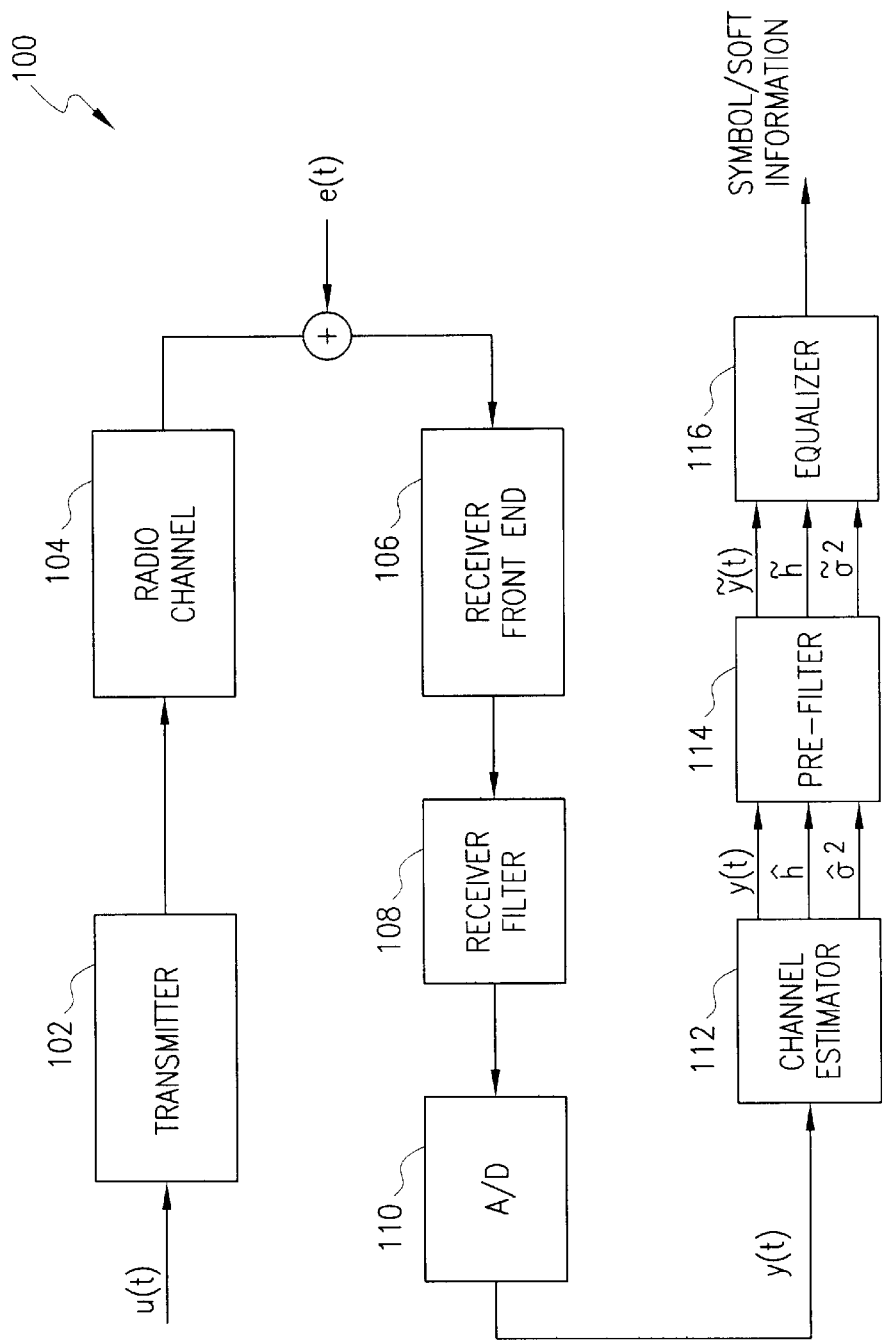
FIG. 1 (PRIOR ART) is a block diagram illustrating the basic components of a conventional communications system.
Figure 2:
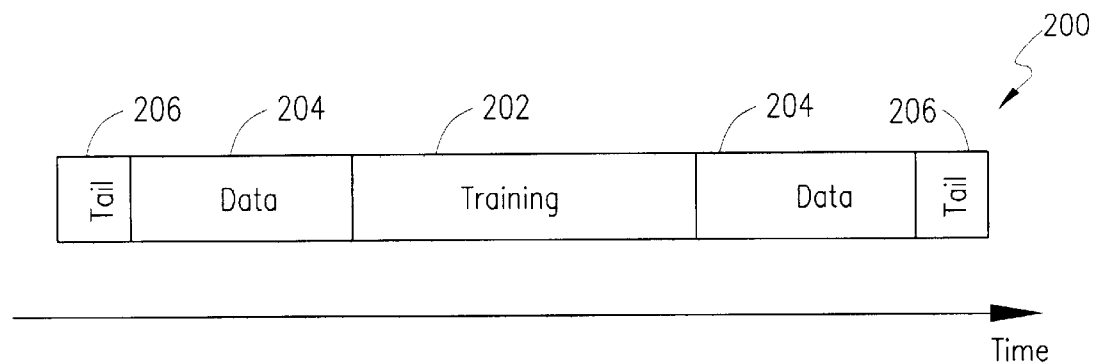
FIG. 2 (PRIOR ART) is a diagram illustrating a typical Time Division Multiple Access (TDMA) burst.
Figure 3A:
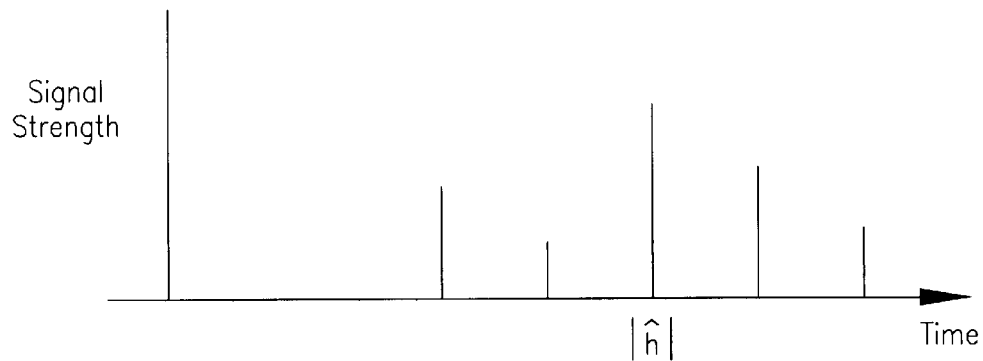
FIG. 3A (PRIOR ART) is an exemplary graph illustrating the signal strengths of estimated channel filter taps $\hat{h}$ before being filtered by a pre-filter shown in FIG. 1.
Figure 3B:
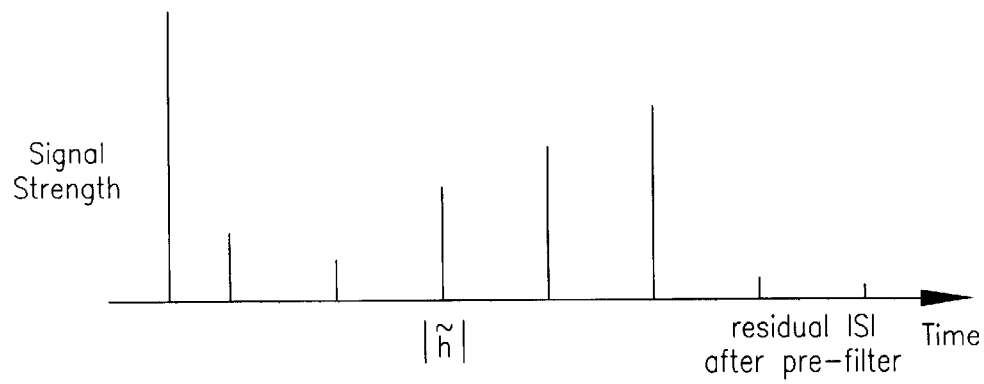
FIG. 3B (PRIOR ART) is an exemplary graph illustrating the signal strengths of estimated channel filter taps $\hat{h}$ after being filtered by the pre-filter shown in FIG. 1.

The communications system 500 includes a transmitter 502 that receives an original message u(t) and transmits the original message on a radio channel 504 to a receiver front end 506. In addition to receiving the transmitted original message u(t), the receiver front end 506 also receives a noise element e(t). The receiver front end 506 forwards the transmitted original message u(t) and the noise element e(t) to a receiver filter 508. The receiver filter 508 filters the transmitted original message u(t) and the noise element e(t) before an analog-to-digital convertor 510 converts the filtered original message u(t) and noise element e(t) to a received signal y(t). At this point, the received signal y(t) can be represented as either one of the two equations below:

$$y(t)=h(t)*u(t)+e(t), (t1, \ldots, T) \quad (3)$$

$$y(t)=\Sigma_n u(t-n)h(n)+e(t), (t=1, \ldots, T) \quad (4)$$

where y(t) is the received signal; h is an unknown radio channel; u(t) is the original message; e(t) is the noise element; n is the total number of channel taps; and T is the number of received samples in the burst 200 (see FIG. 2).

The received signal y(t) is input to a memory 512 that stores and outputs the received signal y(t) to both a pre-filter 514 and a channel estimator 516. As described below, the pre-filter 514 outputs a filtered received signal $\tilde{y}(t)$ to an equalizer 518 which outputs a decoded message after the pre-filter receives a set of pre-filter coefficients (shown as $\{g_i\}_{i\in[1,K]}$) from a pre-filter calculation controller 522.

The channel estimator 516 operates to synchronize the burst 200 and estimate the number of channel filter taps $\hat{h}(t)$ by correlating the received signal y(t) with the known training sequence 202 (see FIG. 2). The output of the channel estimator 516 includes the information parts of the received signal y(t) which are an estimated number of channel filter taps $\hat{h}$ (shown as $\{h_i\}_{i\in[O,L-1]}$) and an estimated noise effect $\hat{\sigma}^2$. The estimated channel filter taps $\hat{h}$ (L taps) and the estimated noise effect are input to a controller 520.

The controller 520 generally evaluates the estimated noise effect $\hat{\sigma}^2$ and the estimated channel filter taps $\hat{h}$ to determine a number of pre-filter taps (K taps) to be used in the pre-filter 514 and a number of equalizer taps (P taps) to be used in the equalizer 518 where the number of equalizer taps (P taps) is less than or equal to the estimated number of channel filter taps $\hat{h}$ (L taps). In addition, the controller 520 can partition the number of equalizer taps (P taps) between a first part (e.g., DFE having P-M taps) and a second part (e.g., MLSE having M taps) of the equalizer 518 (e.g., DFSE having P taps).

More specifically, the controller 520 determines the number of pre-filter taps (K taps) and the number of equalizer taps (P and M taps) using quality parameters such as Signal-to-Noise Ratio (SNR) and the estimated noise effect $\hat{\sigma}^2$ both of which can be estimated in the channel estimator 516 and are represented below:

$$SNR = \frac{\sum h_i^2}{\frac{1}{N}\sum e_l^2}; i \in [O, L-1], l \in [1, N] \tag{5}$$

$$\sigma^2 = \frac{1}{N}\sum e_l^2; l \in [1, N] \tag{6}$$

where N is the number of received signals used to determine the channel estimation.

The controller 520 may also use other quality parameters to determine the number of pre-filter taps (K taps) and the number of equalizer taps (P and M taps). For instance, the controller 520 using the estimated channel filter taps ĥ can calculate an envelope of the channel impulse response (Env_h) and determine the number of effective channel taps (Eff_h) that have energy above a predetermined threshold. The controller 520 can also calculate the channel tap distribution (Distr_h) using, for example, the envelope variance of the effective channel taps or the cumulative channel tap energy. Thereafter, the controller 520 determines the number of taps (K, P and M taps) based on prior knowledge of the optimal trade-off between performance and complexity in view of the given channel characteristics.

In other words, the controller 520 can decide the number of taps (K, P and M taps) independently using the following functions:

$K$=function determine_$K$ ($\hat{\sigma}^2$, Env_$h$, Eff_$h$, Distr_$h$) (7)

$P$=function determine_$P$ ($\hat{\sigma}^2$, Env_$h$, Eff_$h$, Distr_$h$) (8)

$M$=function determine_$M$ ($\hat{\sigma}^2$, Env_$h$, Eff_$h$, Distr_$h$) (9)

Disable_Pre-Filter Flag=function disable_pre-filter ($\hat{\sigma}^2$, Env_$h$, Eff_$h$, Distr_$h$) (10)

where the functions can be seen as elements of a matrix in which $\hat{\sigma}^2$, Env_h, Eff_h, and Distr_h are indexes of the matrix. The matrix is pre-computed according to the above-mentioned optimal performance.

It should be understood that the use of the above-described quality measures should not limit the invention. In fact, the determination as to the number of pre-filter taps (K taps), MLSE taps (M taps) and DFE taps (P-M taps) may be based on quality measures other than those described above without loss of generality.

The use of a long pre-filter 514 may not be necessary depending on the channel impulse response and if the signal energy is large compared to the noise energy in a received burst. Moreover, since pre-filtration aims to concentrate the energy of the received signal y(t) to the MLSE part of the equalizer 518, it may not be necessary to use the pre-filter 514 at all provided the quality of the received signal in the MLSE taps is sufficient. On the other hand, it may be desirable to use a long pre-filter 514 to handle very time dispersive channels.

After determining the number of taps (K, P and M taps), the controller 520 forwards the MLSE taps (M taps) and the DFE taps (P-M taps) to the equalizer 518. The controller 520 also forwards the pre-filter taps (K taps), the estimated noise effect $\hat{\sigma}^2$ and the estimated channel filter taps ĥ to a pre-filter calculation controller 522. The pre-filter calculation controller 522 determines the above-mentioned set of pre-filter coefficients (shown as $\{g_i\}_{i\in[1,K]}$) which are forward to the pre-filter 514. In addition, the pre-filter calculation controller 522 forwards an estimated noise effect $\hat{\sigma}^2$ and estimated channel filter taps ĥ (shown as $\{\hat{h}_i\}_{i\in[O,P-1]}$) to the equalizer 518.

The equalizer 518 upon receiving the pre-filtered sequence ỹ, the estimated noise effect $\hat{\sigma}^2$ and the estimated channel filter taps ĥ operates to output both a symbol and soft information. The symbol is an estimation of the original message u(t). And, the soft information is a reliability measure of the estimated symbol or bits forming the estimated symbol.

It should be understood that the above-described DFSE equalizer 518 is used as an example and that a pure DFE equalizer could be used instead of the DFSE simply by setting M=O or a pure MLSE could be used instead of the DFSE simply by setting M=P.

Referring to FIG. 6, there is a flowchart illustrating the basic steps of the preferred method 600 in accordance with the present invention. Beginning at step 602, the received message y(t) is stored in the memory 512 and forwarded to the pre-filter 514 and the channel estimator 516.

At step 604, the channel estimator 516 estimates the quality parameter $\hat{\sigma}^2$ (for example) and the number of channel filter taps ĥ (L taps) using the received message y(t).

At step 606, the controller 520 evaluates the estimated quality parameter and the estimated number of channel filter taps ĥ (L taps) to determine the number of pre-filter taps (K taps) and the number of equalizer taps (P taps) where the number of equalizer taps (P taps) is less than or equal to the estimated number of channel filter taps ĥ (L taps). As above, the number of equalizer taps (P taps) can be partitioned to have MLSE taps (M taps) and DFE taps (P-M taps).

At step 608, the pre-filter calculating controller 522 calculates the pre-filter coefficients $g_i$ using the estimated quality parameter $\hat{\sigma}^2$, the estimated number of channel filter taps ĥ and the number of pre-filter taps (K taps). The pre-filter calculating controller 522 forwards the pre-filter coefficients $g_i$ to the pre-filter 514. The pre-filter calculating controller 522 also forwards the estimated quality parameter $\hat{\sigma}^2$ and the estimated number of channel filter taps ĥ to the equalizer 518.

At step 610, the pre-filter 514 filters the received message y(t) using the number of pre-filter taps (K taps) and the calculated pre-filter coefficients $g_i$. Thereafter at step 612, the equalizer 518 decodes the filtered message y(t) using the determined number of equalizer taps (P taps), including the MLSE taps (M taps) and DFE taps (P-M taps).

From the foregoing, it can be readily appreciated by those skilled in the art that the present invention provides an apparatus and method that effectively minimizes the computational load and reduces the power consumption in a mobile station by adjusting the number of taps used in a pre-filter (if any) and an equalizer. Also, the apparatus and method disclosed can further partition the number of equalizer taps between a first part (DFE part) and a second part (MLSE part) of the equalizer (DFSE equalizer).

Although several embodiments of the method and apparatus of the present invention have been illustrated in the accompanying Drawings and described in the foregoing Detailed Description, it will be understood that the invention is not limited to the embodiments disclosed, but is capable of numerous rearrangements, modifications and substitutions without departing from the spirit of the invention as set forth and defined by the following claims.

What is claimed is:

1. An apparatus comprising:
    a pre-filter;
    an equalizer;
    a channel estimator for estimating a quality parameter and a number of channel filter taps using a stored signal; and
    a controller, coupled to said channel estimator, for evaluating the estimated quality parameter and the estimated number of channel filter taps to determine a number of pre-filter taps to be used in said pre-filter and a number of equalizer taps to be used in said equalizer where the number of equalizer taps is less than or equal to the estimated number of channel filter taps.

2. The apparatus of claim 1, further comprising a pre-filter calculation controller, coupled to said controller, for calculating pre-filter coefficients using the estimated quality parameter, the estimated number of channel filter taps and the number of pre-filter taps, and for forwarding the calculated pre-filter coefficients to said pre-filter.

3. The apparatus of claim 1, wherein said controller further includes means for partitioning the number of equalizer taps between a first part and a second part of the equalizer.

4. The apparatus of claim 3, wherein said equalizer further includes a delayed decision feedback sequence estimator and the first part includes a decision feedback equalizer and the second part includes a maximum likelihood sequence estimator.

5. The apparatus of claim 1, wherein said estimated quality parameter further includes a distribution of channel tap energy, a signal-to-noise ratio or a noise effect.

6. The apparatus of claim 1, wherein said apparatus is incorporated within a receiver, a base station or a mobile phone.

7. A mobile phone capable of reducing power consumption therein by minimizing the computational load associated with a pre-filter and an equalizer, said mobile phone comprising:
    a channel estimator for estimating a quality parameter and a number of channel filter taps using a stored message; and
    a controller, coupled to said channel estimator, for evaluating the estimated quality parameter and the estimated number of channel filter taps to determine a number of pre-filter taps to be used in said pre-filter and a number of equalizer taps to be used in said equalizer where the number of equalizer taps is less than or equal to the estimated number of channel filter taps.

8. The mobile phone of claim 7, further comprising a pre-filter calculation controller, coupled to said controller, for calculating pre-filter coefficients using the estimated quality parameter, the estimated number of channel filter taps and the number of pre-filter taps, and for forwarding the calculated pre-filter coefficients to said pre-filter.

9. The mobile phone of claim 7, wherein said controller further includes means for partitioning the number of equalizer taps between a first part and a second part of the equalizer.

10. The mobile phone of claim 9, wherein said equalizer further includes a delayed decision feedback sequence estimator and the first part includes a decision feedback equalizer and the second part includes a maximum likelihood sequence estimator.

11. The mobile phone of claim 7, wherein the estimated quality parameter further includes a distribution of channel tap energy, a signal-to-noise ratio or a noise effect.

12. A communications system comprising:
    a transmitter for transmitting a message;
    a receiver for receiving the transmitted message, said receiver further including;
        a pre-filter;
        an equalizer;
        a channel estimator for estimating a quality parameter and a number of channel filter taps using the received message; and
        a controller for evaluating the estimated quality parameter and the estimated number of channel filter taps to determine a number of pre-filter taps used in said pre-filter and a number of equalizer taps used in said equalizer where the number of equalizer taps is less than or equal to the estimated number of channel filter taps.

13. The communications system of claim 12, further comprising a pre-filter calculation controller for calculating pre-filter coefficients using the estimated quality parameter, the estimated number of channel filter taps and the number of pre-filter taps.

14. The communications system of claim 12, wherein said controller further includes means for partitioning the number of equalizer taps between a first part and a second part of the equalizer.

15. The communications system of claim 12, wherein said equalizer further includes a delayed decision feedback sequence estimator.

16. The communications system of claim 12, wherein the estimated quality parameter further includes a distribution of channel tap energy, a signal-to-noise ratio or a noise effect.

17. A method for determining the number of taps to be used in a pre-filter and an equalizer, both of which are components of a receiver, said method comprising the steps of:
    storing a message;
    estimating a quality parameter and a number of channel filter taps using the stored message; and
    evaluating the estimated quality parameter and the estimated number of channel filter taps to determine a number of pre-filter taps to be used in said pre-filter and a number of equalizer taps to be used in said equalizer where the number of equalizer taps is less than or equal to the estimated number of channel filter taps.

18. The method of claim 17, further comprising the steps of:
    calculating pre-filter coefficients using the estimated quality parameter, the estimated number of channel filter taps and the number of pre-filter taps; and
    forwarding the calculated pre-filter coefficients to said pre-filter.

19. The method of claim 17, further comprising the step of partitioning the number of equalizer taps between a first part and a second part of the equalizer.

20. The method of claim 19, wherein said equalizer further includes a delayed decision feedback sequence estimator and the first part includes a decision feedback equalizer and the second part includes a maximum likelihood sequence estimator.

21. A method for reducing the power consumption within a mobile phone by adjusting the number of taps used in a pre-filter and an equalizer, said method comprising the steps of:
    storing a message;
    estimating a quality parameter and a number of channel filter taps using the stored message; and evaluating the estimated quality parameter and the estimated number of channel filter taps to determine a number of pre-filter taps to be used in said pre-filter and a number of equalizer taps to be used in said equalizer;

calculating pre-filter coefficients using the estimated quality parameter, the estimated number of channel filter taps and the determined number of pre-filter taps;

filtering the stored message using the determined number of pre-filter taps and the calculated pre-filter coefficients; and equalizing the filtered message using the determined number of equalizer taps.

22. The method of claim 21, further comprising the step of partitioning the determined number of equalizer taps between a first part and a second part of the equalizer.

23. The method of claim 22, wherein said equalizer further includes a delayed decision feedback sequence estimator.

24. An apparatus for minimizing the computational load in a pre-filter, said apparatus comprising:

a channel estimator for estimating a quality parameter and a number of channel filter taps using a stored signal; and a controller, coupled to said channel estimator, for evaluating the estimated quality parameter and the estimated number of channel filter taps to determine a number of pre-filter taps, if any, to be used in said pre-filter;

a pre-filter calculation controller, coupled to said controller, for calculating pre-filter coefficients using the estimated quality parameter, the estimated number of channel filter taps and the determined number of pre-filter taps, and for forwarding the calculated pre-filter coefficients to said pre-filter.

* * * * *

UNITED STATES PATENT AND TRADEMARK OFFICE
CERTIFICATE OF CORRECTION

PATENT NO. : 6,466,616 B1
DATED : October 15, 2002
INVENTOR(S) : Stenström et al.

It is certified that error appears in the above-identified patent and that said Letters Patent is hereby corrected as shown below:

<u>Title page,</u>
Item [12], replace "Stenstrom" with -- Stenström --

<u>Column 4,</u>
Line 34, replace "$y(t) = h(t) *u(t) + e(t), (t1,...., T)$    (3)" with
-- $y(t) = h(t) *u(t) + e(t), (t = 1,...., T)$    (3) --

<u>Column 6,</u>
Line 5, replace "$\hat{h}$" with -- $\tilde{h}$ --

Signed and Sealed this

Twenty-fourth Day of June, 2003

JAMES E. ROGAN
*Director of the United States Patent and Trademark Office*